United States Patent
Li et al.

(10) Patent No.: US 10,261,618 B2
(45) Date of Patent: Apr. 16, 2019

(54) TOUCH DRIVING CIRCUIT AND TOUCH SENSITIVE DISPLAY PANEL

(71) Applicants: SHENZHEN CHINA STAR OPTOELECTRONICS TECHNOLOGY CO., LTD., Shenzhen, Guangdong (CN); WUHAN CHINA STAR OPTOELECTRONICS TECHNOLOGY CO., LTD., Wuhan, Hubei (CN)

(72) Inventors: Man Li, Shenzhen (CN); Xiaoping Tan, Shenzhen (CN); Xingling Guo, Shenzhen (CN)

(73) Assignees: SHENZHEN CHINA STAR OPTOELECTRONICS TECHNOLOGY CO., LTD, Shenzhen, Guangdong (CN); WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 463 days.

(21) Appl. No.: 14/939,080

(22) PCT Filed: Sep. 18, 2015

(86) PCT No.: PCT/CN2015/089932
§ 371 (c)(1),
(2) Date: Nov. 12, 2015

(87) PCT Pub. No.: WO2017/041322
PCT Pub. Date: Mar. 16, 2017

(65) Prior Publication Data
US 2018/0113555 A1  Apr. 26, 2018

(30) Foreign Application Priority Data

Sep. 11, 2015 (CN) .......................... 2015 1 0579898

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04103* (2013.01)

(58) Field of Classification Search
CPC ..................... G06F 3/0416; G06F 2203/04103
See application file for complete search history.

(56) References Cited

U.S. PATENT DOCUMENTS

2011/0267283 A1* 11/2011 Chang .................. G06F 3/0418
                                                           345/173
2014/0225840 A1*  8/2014 Jamshidi-Roudbari ..................
                                                           G06F 3/0412
                                                           345/173

(Continued)

FOREIGN PATENT DOCUMENTS

| CN | 103941940 A | 7/2014 |
| CN | 104834427 A | 8/2015 |
| CN | 104866141 A | 8/2015 |

*Primary Examiner* — Afroza Chowdhury
(74) *Attorney, Agent, or Firm* — Muncy, Geissler, Olds & Lowe, P.C.

(57) ABSTRACT

A touch driving circuit and a touch sensitive display panel are provided. The touch driving circuit is disposed on a corresponding touch sensitive display panel. The touch driving circuit includes a touch driving chip, driving signals encoders, driving lines, sensing lines, driving wires, and sensing wires. Preliminary touch driving signals herein include touch data signals and touch clock signals, and the driving signals encoders convert the touch data signals into the touch driving signals according to the touch clock signals.

12 Claims, 3 Drawing Sheets

(56) References Cited

U.S. PATENT DOCUMENTS

| | | |
|---|---|---|
| 2014/0333559 A1 | 11/2014 | Wilson et al. |
| 2016/0124549 A1 | 5/2016 | Crandall |
| 2017/0153742 A1 | 6/2017 | Pang et al. |
| 2017/0186773 A1 | 6/2017 | Fan et al. |

\* cited by examiner

TOUCH DRIVING CIRCUIT AND TOUCH SENSITIVE DISPLAY PANEL

TECHNICAL FIELD OF THE INVENTION

The present invention relates to a display driving technology, and in particular to a touch driving circuit and a touch sensitive display panel.

BACKGROUND OF THE INVENTION

With an increasingly fierce competition in a smart phone market, a touch sensitive display panel brings a new round of the competition. However, with an increasing resolution in the touch sensitive display panel, the time for a display scanning in the touch sensitive display panel is getting longer, and the time for a touch scanning may be insufficient, thus limiting the development of the touch sensitive display panel.

The touch sensitive display panel includes driving lines which are utilized to transmit driving signals and sensing lines which are utilized to receive sensing signals. A touch driving circuit of a conventional mutual-capacitance touch sensitive display panel can simultaneously transmit different driving signals for all the driving lines, and then receive the sensing signals of the sensing lines (different driving signals corresponding to different sensing signals). The position of the touched driving line is determined by the magnitude of the sensing signals, and the position of the touched sensing line is determined by the source of the sensing signals. Finally, the position of the sensing signals is determined by the touched driving line and the touched sensing line. This can effectively reduce the time for the touch scanning, but a plurality of pins for transmitting the driving signals need to be disposed on the touch driving circuit, and it is not conducive to a compact size of the touch driving circuit and low costs. Moreover, since the wires corresponding to the touched driving lines are added, the manufacturing complexity of the touch driving circuit is increased.

Therefore, there is a significant need to provide a touch driving circuit and a touch sensitive display panel for solving the problem existing in the prior art.

SUMMARY OF THE INVENTION

An objective of the present invention is to provide a touch driving circuit and a touch sensitive display panel with low production costs and a low manufacturing complexity, thereby solving the problems of the high production costs and the high manufacturing complexity in the conventional touch driving circuit and touch sensitive display panel.

An embodiment of the present invention provides a touch driving circuit, which is disposed on a corresponding touch sensitive display panel, including: a touch driving chip disposed laterally on a side of the touch sensitive display panel, utilized to transmit preliminary touch driving signals and receive touch sensing signals; a plurality of driving signals encoders utilized to convert the preliminary touch driving signals into touch driving signals; a plurality of driving lines disposed on a middle of the touch sensitive display panel, utilized to receive the touch driving signals; a plurality of sensing lines disposed on the middle of the touch sensitive display panel, utilized to generate the touch sensing signals according to the touch driving signals and a touch operation; a plurality of driving wires utilized to transmit the preliminary touch driving signals to the driving signal encoders; and a plurality of sensing wires utilized to transmit the touch sensing signals to the touch driving chip; wherein the preliminary touch driving signals comprise touch data signals and touch clock signals, and the driving signals encoders convert the touch data signals into the touch driving signals according to the touch clock signals; wherein the touch clock signals respectively corresponding to the driving lines are different; wherein the touch driving chip is disposed in a touch sensitive display driving integrated chip.

In the touch driving circuit of the present invention, a phase difference of the touch clock signals corresponding to two adjacent driving lines is between 0.15 microseconds and 0.3 microseconds.

In the touch driving circuit of the present invention, the touch sensitive display driving integrated chip further comprises a display driving chip, and the display driving chip comprises a scanning signal generation module utilized to generate scanning signals and a data signal generation module utilized to generate data signals.

An embodiment of the present invention provides a touch driving circuit, which is which is disposed on a corresponding touch sensitive display panel, including: a touch driving chip disposed laterally on a side of the touch sensitive display panel, utilized to transmit preliminary touch driving signals and receive touch sensing signals; a plurality of driving signals encoders utilized to convert the preliminary touch driving signals into touch driving signals; a driving line disposed on a middle of the touch sensitive display panel, utilized to receive the touch driving signals; a sensing line disposed on the middle of the touch sensitive display panel, 20 utilized to generate the touch sensing signals according to the touch driving signals and a touch operation; a driving wire utilized to transmit the preliminary touch driving signals to the driving signal encoders; and a sensing wire utilized to transmit the touch sensing signals to the touch driving chip; wherein the preliminary touch driving signals comprise touch data signals and touch clock signals, and the driving signals encoders convert the touch data signals into the touch driving signals according to the touch clock signals.

In the touch driving circuit of the present invention, the touch clock signals respectively corresponding to the driving lines are different.

In the touch driving circuit of the present invention, a phase difference of the touch clock signals corresponding to two adjacent driving lines is between 0.15 microseconds and 0.3 microseconds.

In the touch driving circuit of the present invention, the touch driving signals respectively corresponding to the driving lines are identical.

In the touch driving circuit of the present invention, the touch driving chip is disposed in a touch sensitive display driving integrated chip.

In the touch driving circuit of the present invention, the touch sensitive display driving integrated chip further comprises a display driving chip, and the display driving chip comprises a scanning signal generation module utilized to generate scanning signals and a data signal generation module utilized to generate data signals.

The present invention further provides a touch sensitive display panel, which includes a glass substrate and a touch driving circuit disposed on the glass substrate, wherein the touch driving circuit includes: a touch driving chip disposed laterally on a side of the touch sensitive display panel, utilized to transmit preliminary touch driving signals and receive touch sensing signals; a plurality of driving signals encoders utilized to convert the preliminary touch driving signals into touch driving signals; a driving line disposed on a middle of the touch sensitive display panel, utilized to receive the touch driving signals; a sensing line disposed on the middle of the touch sensitive display panel, utilized to generate the touch sensing signals according to the touch driving signals and a touch operation; a driving wire utilized to transmit the preliminary touch driving signals to the driving signal encoders; and a sensing wire utilized to transmit the touch sensing signals to the touch driving chip; wherein the preliminary touch driving signals comprise touch data signals and touch clock signals, and the driving signals encoders convert the touch data signals into the touch driving signals according to the touch clock signals.

In the touch sensitive display panel of the present invention, the touch clock signals respectively corresponding to the driving lines are different.

In the touch sensitive display panel of the present invention, a phase difference of the touch clock signals corresponding to two adjacent driving lines is between 0.15 microseconds and 0.3 microseconds.

In the touch sensitive display panel of the present invention, the touch driving signals respectively corresponding to the driving lines are identical.

In the touch sensitive display panel of the present invention, the touch driving chip is disposed in a touch sensitive display driving integrated chip.

In the touch sensitive display panel of the present invention, the touch sensitive display driving integrated chip further comprises a display driving chip, and the display driving chip comprises a scanning signal generation module utilized to generate scanning signals and a data signal generation module utilized to generate data signals.

In comparison with the prior art touch driving circuit and touch sensitive display panel, the touch driving circuit and the touch sensitive display panel of the present invention save the manufacturing cost of the touch driving circuit and decrease the manufacturing complexity of the touch driving circuit by means of using the touch data signals and the touch clock signals to generate the touch driving signals, thereby solving the problems of the high production costs and the high manufacturing complexity in the conventional touch driving circuit and touch sensitive display panel.

It is to be understood that both the foregoing general description and the following detailed description of the present invention are exemplary and explanatory and are intended to provide further explanation of the invention as claimed.

DETAILED DESCRIPTION OF THE INVENTION

Figure 1:
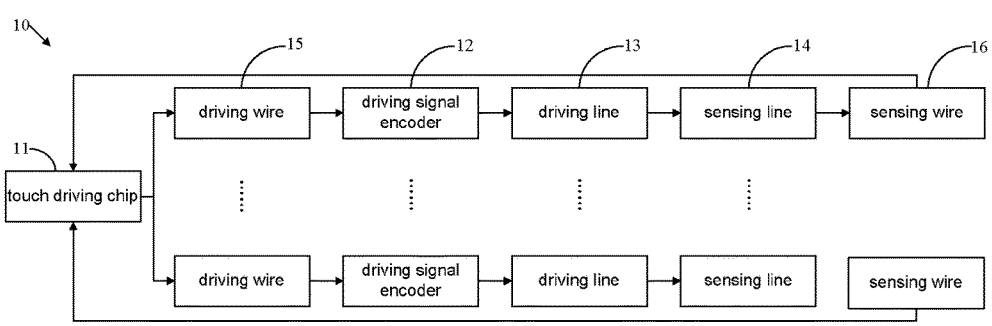
FIG. 1 is a block diagram illustrating a touch driving circuit according to a preferred embodiment of the present invention.

Descriptions of the following embodiments refer to attached drawings which are utilized to exemplify specific embodiments. Directional terms mentioned in the present invention, such as "top" and "down", "front", "rear", "left", "right", "inside", "outside", "side" and so on are only directions with respect to the attached drawings. Therefore, the used directional terms are utilized to explain and understand the present invention but not to limit the present invention.

In different drawings, the same reference numerals refer to like parts throughout the drawings.

Figure 2:
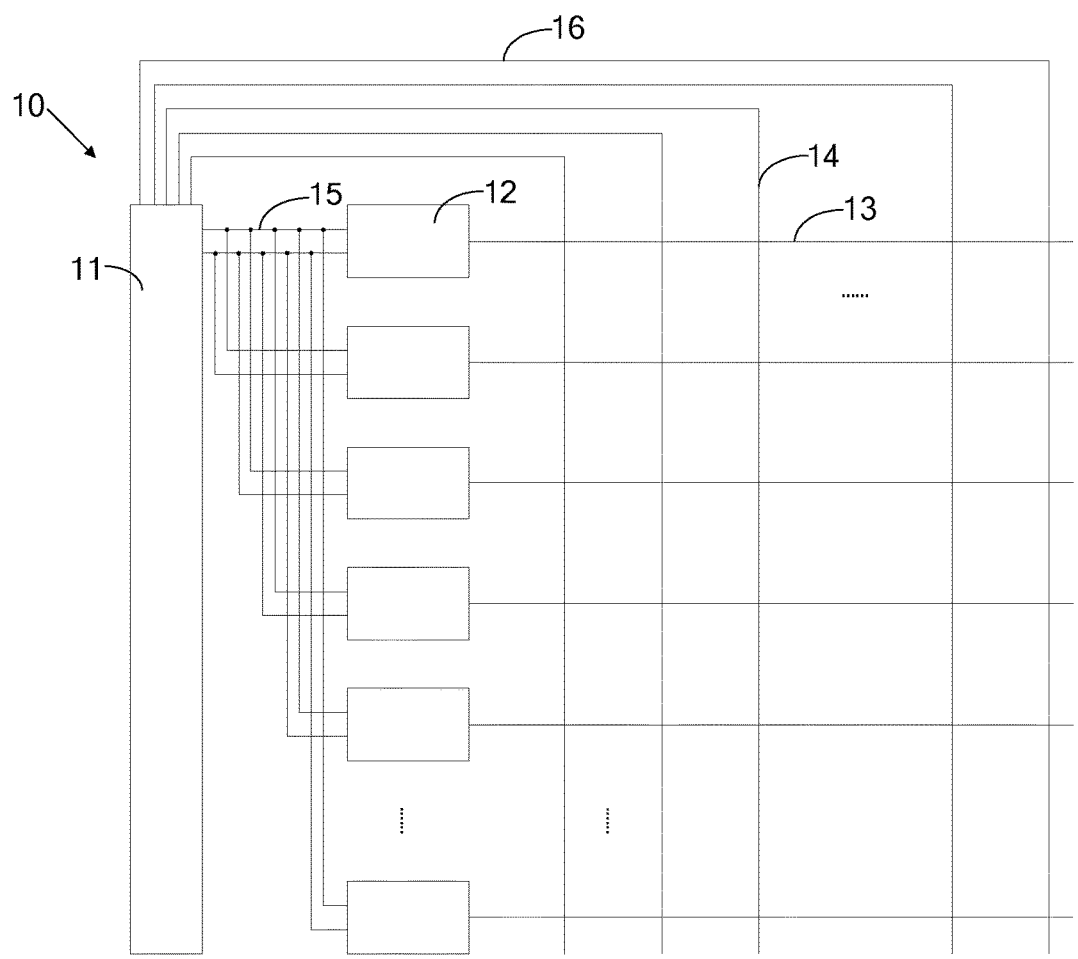
FIG. 2 is a specific circuit diagram illustrating the touch driving circuit according to the preferred embodiment of the present invention.

Referring to FIG. 1 and FIG. 2, FIG. 1 is a block diagram illustrating a touch driving circuit according to a preferred embodiment of the present invention; FIG. 2 is a specific circuit diagram illustrating the touch driving circuit according to the preferred embodiment of the present invention. The touch driving circuit 10 of the preferred embodiment is disposed on a corresponding touch sensitive display panel. The touch driving circuit 10 includes a touch driving chip 11, a plurality of driving signal encoders 12, a plurality of driving lines 13, a plurality of sensing lines 14, a plurality of driving wires 15, and a plurality of sensing wires 16. The touch driving chip 11 is disposed laterally on a side of the touch sensitive display panel and is utilized to transmit preliminary touch driving signals and receive touch sensing signals. The driving signal encoders 12 are utilized to convert the preliminary touch driving signals into touch driving signals. A driving line 13 is disposed on a middle of the touch sensitive display panel and is utilized to receive the touch driving signals. A sensing line 14 is disposed on the middle of the touch sensitive display panel and is utilized to generate the touch sensing signals according to the touch driving signals and a touch operation. A driving wire 15 is utilized to transmit the preliminary touch driving signals to the driving signal encoders. A sensing wire 16 is utilized to transmit the touch sensing signals to the touch driving chip 11. The preliminary touch driving signals herein include touch data signals and touch clock signals, and the driving signals encoders 12 convert the touch data signals into the touch driving signals according to the touch clock signals.

Figure 3:
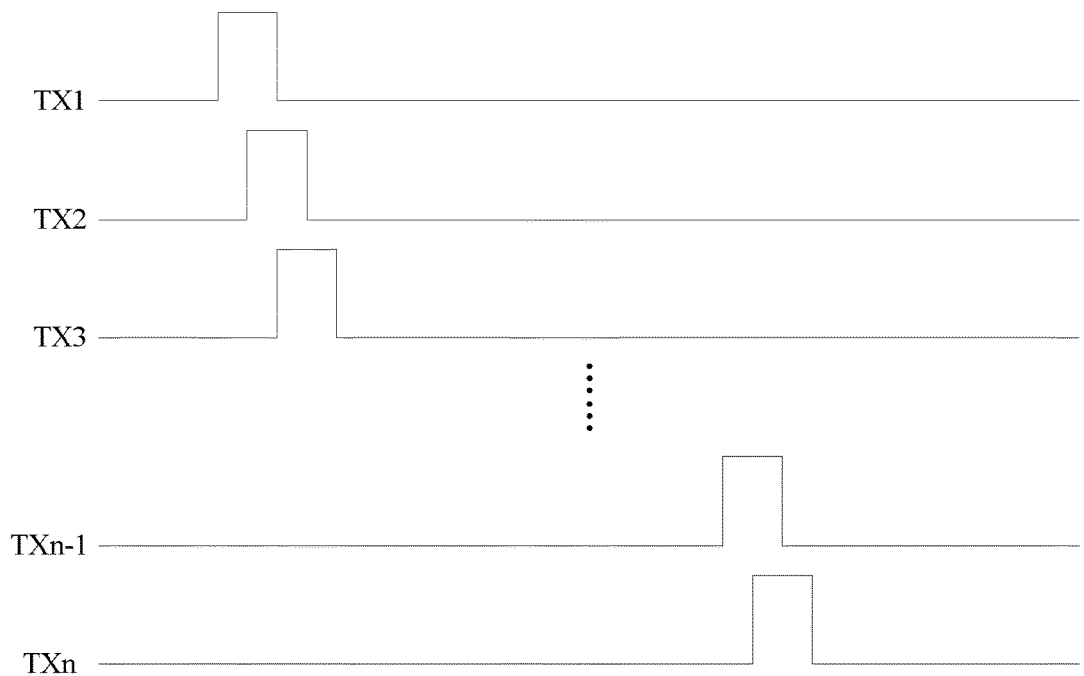
FIG. 3 is a timing chart schematically illustrating touch clock signals of preliminary touch driving signals of the touch driving chip of the preferred embodiment of the touch driving circuit of the present invention.

The specific operating principle of the touch driving circuit of the preferred embodiment will now be described in detail with reference to FIG. 2 and FIG. 3. FIG. 3 is a timing chart schematically illustrating the touch clock signals of preliminary touch driving signals of the touch driving chip of the preferred embodiment of the touch driving circuit of the present invention.

First, the touch driving chip 11 of the touch driving circuit 10 generates preliminary touch driving signals, and the preliminary touch driving signals include the touch data signals which are utilized to represent driving data signals and the touch clock signals which are utilized to represent driving clock signals. Then the touch driving chip 11 transmits the above-mentioned touch data signals and touch clock signals to the corresponding driving wires 15 and transmits to driving signal encoders 12 via the driving wires 15. As shown in FIG. 3, the touch data signals and the touch clock signals are separately transmitted the corresponding driving signal encoders 12.

Subsequently, the driving signal encoders 12 convert the touch data signals into touch driving signals according to the touch clock signals. For example, one of the driving signal encoders 12 can utilize a second touch clock signal of each touch scanning as a converting signal. That is, the driving signal encoder 12 receives the second touch clock signal and converts the corresponding touch data signal into the touch driving signal immediately. Since the touch clock signal corresponding to each driving line 13 is different, the transmitting timings of the touch driving signals, which the driving signal encoders 12 transmit to each driving line 13, are different. Thus, the touch driving signals of the driving lines 13 can be better distinguished. Specifically, please refer to the touch driving signals TX1, TX2, TX3 . . . TXn−1, and TXn in FIG. 3.

Here, in order to ensure distinguishing the different touch driving signals, a phase difference of the touch clock signals corresponding to two adjacent driving lines 13 should be set between 0.15 microseconds and 0.3 microseconds. If the phase difference is set too small, it may result in unable to distinguish the touch driving signals corresponding to the adjacent driving lines 13. If the phase difference is set too large, it may affect the accuracy of the touch driving scan; that is, the number of the driving lines 13 which are driven by the touch driving chip 11 decreases in the same duration.

Since the different touch driving signals herein are distinguished by the transmitting timings of the touch driving signals, the waveform of the touch driving signal corresponding to each driving line 13 can be identical, as shown in FIG. 3. This can further reduces the production cost of the touch driving circuit 10.

Then the driving signal encoders 12 transmit the touch driving signals to the driving lines 13 disposed on the middle of the touch sensitive display panel. Accordingly, the sensing lines 14 disposed on the middle of the touch sensitive display panel can generate the touch sensing signal corresponding to a touch operation according to the touch driving signals and the touch operation on the touch sensitive display panel.

Finally, the touch sensing signal is transmitted to the touch driving chip 11 via the sensing line 14 and the sensing wire 16. The touch driving chip 11 can determine the position of the touch operation in accordance with the received time (corresponding to the driving line) of the touch sensing signal and the corresponding sensing line 14.

This completes the touch-driving and touch-sensitive processes of the touch driving circuit 10 of the preferred embodiment.

Since the touch driving circuit of the preferred embodiment generates the touch driving signals through the touch data signals and the touch clock signals, a plurality of pins do not need to be set for generating the touch driving signals of the different driving lines. Therefore, the production cost of the touch driving chip of the touch driving circuit is lower, and the manufacturing complexity of the touch driving chip of the touch driving circuit is also lower.

Meanwhile, since a touch sensitive display driving integrated chip (TDDI) includes a display driving chip and a touch driving chip, in which the display driving chip comprises a scanning signal generation module utilized to generate scanning signals and a data signal generation module utilized to generate data signals. Thus, the size of the touch sensitive display driving integrated chip is bigger. If the touch driving chip is disposed in the touch sensitive display driving integrated chip, the size problem of the touch sensitive display driving integrated chip can be better solved, and the advantage of the low production cost of the touch sensitive display driving integrated chip can be better expanded.

The present invention further provides a touch sensitive display panel. The touch sensitive display panel includes a glass substrate and a touch driving circuit disposed on the glass substrate. The touch driving circuit includes a touch driving chip, a plurality of driving signal encoders, a plurality of driving lines, a plurality of sensing lines, a plurality of driving wires, and a plurality of sensing wires. The touch driving chip is disposed laterally on a side of the touch sensitive display panel and is utilized to transmit preliminary touch driving signals and receive touch sensing signals. The touch driving chip is disposed laterally on a side of the touch sensitive display panel and is utilized to transmit preliminary touch driving signals and receive touch sensing signals. The driving signal encoders are utilized to convert the preliminary touch driving signals into touch driving signals. A driving line is disposed on a middle of the touch sensitive display panel and is utilized to receive the touch driving signals. A sensing line is disposed on the middle of the touch sensitive display panel and is utilized to generate the touch sensing signals according to the touch driving signals and a touch operation. A driving wire is utilized to transmit the preliminary touch driving signals to the driving signal encoders. A sensing wire is utilized to transmit the touch sensing signals to the touch driving chip. The preliminary touch driving signals herein include touch data signals and touch clock signals, and the driving signals encoders convert the touch data signals into the touch driving signals according to the touch clock signals.

Preferably, the touch clock signals respectively corresponding to the driving lines are different, and a phase difference of the touch clock signals corresponding to two adjacent driving lines is between 0.15 microseconds and 0.3 microseconds.

Preferably, the touch driving signals respectively corresponding to the driving lines are identical.

Preferably, the touch driving chip is disposed in a touch sensitive display driving integrated chip.

The specific operating principle of the touch sensitive display panel of the preferred embodiment is the same or similar to the relevant description of the above-mentioned preferred embodiment of the touch driving circuit. For details, please refer to the relevant description of the above-mentioned touch driving circuit of the preferred embodiment.

The touch driving circuit and the touch sensitive display panel of the present invention save the manufacturing cost of the touch driving circuit and decrease the manufacturing complexity of the touch driving circuit by means of using the touch data signals and the touch clock signals to generate the touch driving signals, thereby solving the problems of the high production costs and the high manufacturing complexity in the conventional touch driving circuit and touch sensitive display panel.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A touch driving circuit, disposed on a corresponding touch sensitive display panel, comprising: a touch driving chip disposed laterally on a side of the touch sensitive display panel, utilized to transmit preliminary touch driving signals and receive touch sensing signals, wherein the preliminary touch driving signals comprises touch data signals and touch clock signals; a plurality of driving signals encoders utilized to convert the touch data signals into the touch driving signals according to the touch clock signals; a plurality of driving lines disposed on a middle of the touch sensitive display panel, utilized to receive the touch driving signals; a plurality of sensing lines disposed on the middle of the touch sensitive display panel, utilized to generate the touch sensing signals according to a touch operation when the plurality of sensing lines receive the touch driving signals, converted by the driving signals encoders, from the plurality of driving lines; a plurality of driving wires utilized to transmit the preliminary touch driving signals to the driving signals encoder; and a plurality of sensing wires utilized to transmit the touch sensing signals to the touch driving chip; wherein the touch clock signals respectively corresponding to the driving lines are different; wherein the touch driving chip is disposed in a touch sensitive display driving integrated chip; wherein each of the plurality of the driving signals encoders corresponds to one of the driving lines.

2. The touch driving circuit according to claim 1, wherein the touch sensitive display driving integrated chip further comprises a display driving chip, and the display driving chip comprises a scanning signal generation module utilized to generate scanning signals and a data signal generation module utilized to generate data signals.

3. A touch driving circuit, disposed on a corresponding touch sensitive display panel, comprising: a touch driving chip disposed laterally on a side of the touch sensitive display panel, utilized to transmit preliminary touch driving signals and receive touch sensing signals, wherein the preliminary touch driving signals comprises touch data signals and touch clock signals; a plurality of driving signals encoders utilized to convert the touch data signals into the touch driving signals according to the touch clock signals; a plurality of driving lines disposed on a middle of the touch sensitive display panel, utilized to receive the touch driving signals; a plurality of sensing lines disposed on the middle of the touch sensitive display panel, utilized to generate the touch sensing signals according to a touch operation when the plurality of sensing lines receive the touch driving signals, converted by the driving signals encoders, from the plurality of driving lines; a plurality of driving wires utilized to transmit the preliminary touch driving signals to the driving signal encoders; and a plurality of sensing wires utilized to transmit the touch sensing signals to the touch driving chip; wherein each of the plurality of the driving signals encoders corresponds to one of the driving lines.

4. The touch driving circuit according to claim 3, wherein the touch clock signals respectively corresponding to the driving lines are different.

5. The touch driving circuit according to claim 3, wherein the touch driving signals respectively corresponding to the driving lines are identical.

6. The touch driving circuit according to claim 3, wherein the touch driving chip is disposed in a touch sensitive display driving integrated chip.

7. The touch driving circuit according to claim 6, wherein the touch sensitive display driving integrated chip further comprises a display driving chip, and the display driving chip comprises a scanning signal generation module utilized to generate scanning signals and a data signal generation module utilized to generate data signals.

8. A touch sensitive display panel, comprising a glass substrate and a touch driving circuit disposed on the glass substrate, wherein the touch driving circuit comprises: a touch driving chip disposed laterally on a side of the touch sensitive display panel, utilized to transmit preliminary touch driving signals and receive touch sensing signals, wherein the preliminary touch driving signals comprises touch data signals and touch clock signals; a plurality of driving signals encoders utilized to convert the touch data signals into the touch driving signals according to the touch clock signals; a driving line disposed on a middle of the touch sensitive display panel, utilized to receive the touch driving signals; a sensing line disposed on the middle of the touch sensitive display panel, utilized to generate the touch sensing signals according to a touch operation when the plurality of sensing lines receive the touch driving signals, converted by the driving signals encoders, from the plurality of driving lines; a driving wire utilized to transmit the preliminary touch driving signals to the driving signal encoders; and a sensing wire utilized to transmit the touch sensing signals to the touch driving chip; wherein each of the plurality of the driving signals encoders corresponds to one of the driving lines.

9. The touch sensitive display panel according to claim 8, wherein the touch clock signals respectively corresponding to the driving lines are different.

10. The touch sensitive display panel according to claim 8, wherein the touch driving signals respectively corresponding to the driving lines are identical.

11. The touch sensitive display panel according to claim 8, wherein the touch driving chip is disposed in a touch sensitive display driving integrated chip.

12. The touch sensitive display panel according to claim 11, wherein the touch sensitive display driving integrated chip further comprises a display driving chip, and the display driving chip comprises a scanning signal generation module utilized to generate scanning signals and a data signal generation module utilized to generate data signals.

* * * * *